United States Patent
Wang et al.

(10) Patent No.: US 12,413,159 B2
(45) Date of Patent: Sep. 9, 2025

(54) MICRO INVERTER AND MODULATION METHOD THEREOF

(71) Applicant: Sungrow Power Supply Co., Ltd., Hefei (CN)

(72) Inventors: Zichen Wang, Hefei (CN); Yu Gu, Hefei (CN); Qiaodi Chen, Hefei (CN); Hao Wang, Hefei (CN); Baoji Wang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 35 days.

(21) Appl. No.: 18/493,898

(22) Filed: Oct. 25, 2023

(65) Prior Publication Data

US 2024/0195323 A1 Jun. 13, 2024

(30) Foreign Application Priority Data

Dec. 13, 2022 (CN) .......................... 202211594124.8

(51) Int. Cl.
*H02M 7/5387* (2007.01)
*H02J 3/38* (2006.01)
(Continued)

(52) U.S. Cl.
CPC ........... *H02M 7/53871* (2013.01); *H02J 3/38* (2013.01); *H02M 1/0043* (2021.05); *H02M 3/33571* (2021.05); *H02J 2300/24* (2020.01)

(58) Field of Classification Search
CPC ........... H02M 7/53871; H02M 1/0043; H02M 3/33571; H02J 3/38; H02J 2300/24
See application file for complete search history.

(56) References Cited

U.S. PATENT DOCUMENTS

| | | | |
|---|---|---|---|
| 9,270,201 B1 * | 2/2016 | Potharaju | ............ H02M 7/5395 |
| 2019/0149086 A1 | 5/2019 | Jin et al. | |

(Continued)

FOREIGN PATENT DOCUMENTS

| | | |
|---|---|---|
| CN | 1348248 A | 5/2002 |
| CN | 101150286 A | 3/2008 |

(Continued)

OTHER PUBLICATIONS

First Examination Report for Australian Patent Application No. 2023254921, dated Jul. 12, 2024.
(Continued)

*Primary Examiner* — Rexford N Barnie
*Assistant Examiner* — Duc M Pham
(74) *Attorney, Agent, or Firm* — Wolf, Greenfield & Sacks, P.C.

(57) ABSTRACT

A micro inverter and a modulation method thereof are provided in the present disclosure. The micro inverter includes a filter, a transformer, and a switching circuit. The switching circuit includes one or more first switching circuit and one second switching circuit. Each of the first switching circuits has an input terminal serving as an output terminal of a direct-current power supply, and is configured to convert a direct current into an alternating current and output the alternating current to the second switching circuit. An output terminal of the second switching circuit is connected to a primary side of the transformer. A secondary side of the transformer is connected to an input terminal of the filter.

12 Claims, 6 Drawing Sheets

(51) Int. Cl.
*H02M 1/00* (2007.01)
*H02M 3/335* (2006.01)

(56) References Cited

U.S. PATENT DOCUMENTS

2020/0136524 A1* 4/2020 Chen .................. H02M 7/4826
2024/0072545 A1* 2/2024 Pahlevaninezhad ........................
                                                H02M 3/33507

FOREIGN PATENT DOCUMENTS

CN       102364862 A        2/2012
WO    WO 2015/065291 A1    5/2015

OTHER PUBLICATIONS

Keshani et al., Micro-inverter based on single-ended primary-inductance converter topology with an active clamp power decoupling. IET Power Electron., Jan. 2018;11(1):73-81.
EP23206637.3, Apr. 5, 2024, Extended European Search Report.
Extended European Search Report for European Application No. 23206637.3, dated Apr. 5, 2024.

* cited by examiner

Figure 6

MICRO INVERTER AND MODULATION METHOD THEREOF

This application claims priority to Chinese Patent Application No. 202211594124.8, titled "MICRO INVERTER AND MODULATION METHOD THEREOF", filed on Dec. 13, 2022 with the China National Intellectual Property Administration, which is incorporated herein by reference in its entirety.

TECHNICAL FIELD

The present disclosure relates to the technical field of power electronics, and in particular to a micro inverter and a modulation method thereof.

BACKGROUND

Micro inverters have attracted wide attention, as the micro inverters are capable of achieving component-level MPPT (maximum power point tracking), have no cask effect due to serial connection of components, and are capable of achieving operation and maintenance at a component-level.

Figure 1:
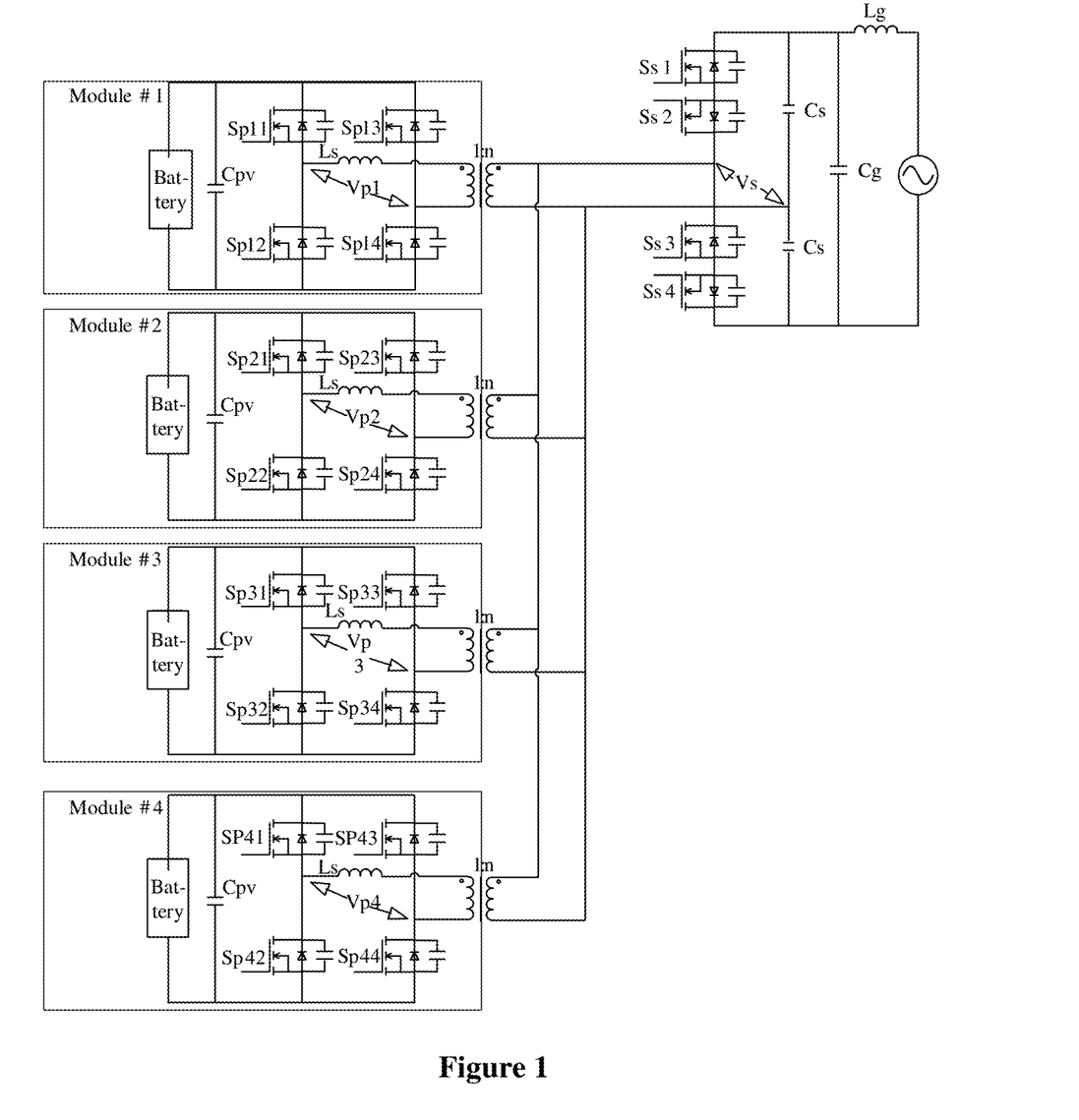
FIG. 1 is a structural diagram of a micro inverter according to a conventional technology.

At present, a one-drive-one micro inverter (where one inverter corresponds to one photovoltaic group) and a one-drive-multiple micro inverter are widely used. In a micro inverter according to a conventional technology, switching devices are disposed on a primary side and a secondary side of a transformer. (In a micro inverter as shown in FIG. 1, switching devices Sp11 to Sp14 are disposed on a primary side of a transformer, and switching devices Ss1 to Ss4 are disposed on a secondary side of the transformer). To ensure a normal operation of the switching devices, it is necessary to provide multiple transformers or an integrated transformer having multiple windings. As the number of lines (each including a primary H-bridge and an impedance device) in the micro inverter increases, more transformers or more windings of the integrated transformer are required. Therefore, the conventional micro inverter having a large number of lines has a large overall volume and high circuit cost.

SUMMARY OF THE INVENTION

In view of this, a micro inverter and a method for modulating the micro inverter are provided according to the present disclosure. In the micro inverter, a first switching circuits and a second switching circuit are both disposed on a primary side of one transformer, and it is not necessary to provide multiple transformers or an integrated transformer having multiple windings based on the number of lines of a primary H-bridge and an impedance device in the inverter. Therefore, cost for a transformer is reduced, and a volume of the micro inverter is reduced.

A micro inverter applied to a photovoltaic system is provided. The micro inverter includes a filter, a transformer, and a switching circuit. The switching circuit includes one or more first switching circuits and one second switching circuit. Each of the first switching circuits has an input terminal serving as an output terminal of a direct-current power supply, and is configured to convert a direct current into an alternating current and output the alternating current to the second switching circuit. An output terminal of the second switching circuit is connected to a primary side of the transformer. A secondary side of the transformer is connected to an input terminal of the filter, and an output terminal of the filter serves as an output terminal of the photovoltaic system.

In an embodiment, the filter is a single-stage filter, a multi-stage LC filter, or an EMI filter.

In an embodiment, the filter includes at least a common-mode capacitor. The common-mode capacitor is connected to the secondary side of the transformer, or the common-mode capacitor is connected to the primary side of the transformer.

In an embodiment, the transformer is an isolation transformer.

In an embodiment, the second switching circuit includes two switch groups. Each of the switch groups includes two switch transistors connected in reverse series. The two switch groups are connected in series, and a connection point of the two switch groups may serve as an input terminal of the second switching circuit.

In an embodiment, two terminals of the serial connection of the two switch groups are connected to two terminals of the primary side of the transformer, in a case that the common-mode capacitor is connected to the secondary side of the transformer; and two terminals of the series-connected switch groups are connected to the common-mode capacitor, in a case that the common-mode capacitor is connected to the primary side of the transformer.

In an embodiment, a quantity of the first switching circuits is more than one, output terminals of the first switching circuits are connected in parallel with each other, and the parallel-connected first switching circuits is connected to connected to the second switching circuit.

In an embodiment, each of the first switching circuit is an H-bridge.

In an embodiment, the micro inverter further includes one or more input capacitors. Each of the input capacitors is connected in parallel with an input terminal of a corresponding one of the first switching circuits.

In an embodiment, the micro inverter further includes an impedance device. The impedance device is configured to perform power regulation on the alternating current outputted from each of the first switching circuits and output a regulated alternating current to the second switching circuit.

In an embodiment, the alternating current is a high-frequency alternating current.

In an embodiment, the impedance device is a single inductor, or a resonant cavity including at least one inductor and at least one capacitor.

A method for modulating a micro inverter, applied to a micro inverter, is provided. The method includes: detecting a direct-current side voltage of each first switching circuit of the micro inverter, a transmission power, and a grid voltage of a power grid connected to an output terminal of the micro inverter; and controlling a second switching circuit and the first switching circuit of the micro inverter to emit waves, based on the direct-current side voltage of each first switching circuit, the transmission power, and the grid voltage of a power grid connected to the output terminal in the micro inverter.

In an embodiment, the controlling a second switching circuit and the first switching circuit of the micro inverter to emit waves, based on the direct-current side voltage of each first switching circuit of the micro inverter, the transmission power, and the grid voltage of a power grid connected to an output terminal of the micro inverter includes: calculating, based on the direct-current side voltage of each first switching circuit, the transmission power and the grid voltage, an internal phase-shift angle between a leading arm and a lagging arm in an H-bridge of the first switching circuit and an external phase-shift angle between the leading arm and the second switching circuit of the micro inverter; determining a duty cycle of a signal pulse of the micro inverter based on the internal phase-shift angle and the external phase-shift angle, and performing, based on the duty cycle, phase shifting or frequency conversion to control the second switching circuit and the first switching circuit of the micro inverter to emit waves.

Advantages of the present disclosure compared with the conventional technology are described below.

A micro inverter is provided in the present disclosure. The micro inverter includes the filter, the transformer, and the switching circuit. The switching circuit includes one or more first switching circuits and one second switching circuit. Each of the first switching circuits has the input terminal serving as an output terminal of the direct-current power supply, and is configured to convert a direct current into an alternating current and output the alternating current to the second switching circuit. The output terminal of the second switching circuit is connected to the primary side of the transformer. The secondary side of the transformer is connected to the input terminal of the filter, and the output terminal of the filter serves as the output terminal of the photovoltaic system. In the micro inverter according to the present disclosure, the first switching circuits and the second switching circuit are both disposed on the primary side of the transformer, and it is not necessary to provide multiple transformers or an integrated transformer having multiple windings based on the number of lines of the primary H-bridge and the impedance device in the inverter. Therefore, cost for a transformer is saved, and a volume of the micro inverter is reduced.

BRIEF DESCRIPTION OF THE DRAWINGS

For a clearer illustration of technical solutions in the embodiments of the present disclosure or conventional technology, the drawings to be used for describing the embodiments or the conventional technology are briefly described hereinafter. Apparently, the drawings in the following description are only some embodiments of the present disclosure. Those of ordinary skills in the art can obtain other drawings from the provided drawings without any creative effort.

DETAILED DESCRIPTION OF THE EMBODIMENTS

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments in the present disclosure, all of the other embodiments which are obtained by those skilled in the art without any creative work fall within the protection scope of the present disclosure.

The relational terms, such as "first" and "second" herein, are only used to distinguish an entity or operation from another entity or operation, and are not intended to necessitate or imply any actual relationship or order between these entities or operations. The terms "including", "including", or any variation thereof are intended to be non-exclusive, indicating that a process, method, item or device that includes a series of elements not only include those elements, but also other elements that are not clearly listed, or further includes elements inherent to the process, method, item or device. In the absence of more restrictions, an element defined by the sentence "including a . . . " do not exclude presence of other identical elements in the process, method, article, or device that includes the element.

The present disclosure is applicable to environments or configurations of various general or dedicated computing apparatuses, such as personal computers, server computers, handheld devices or portable devices, tablet devices, multi-processor apparatuses, or distributed computing environments including any of the listed apparatuses and devices.

Figure 2:
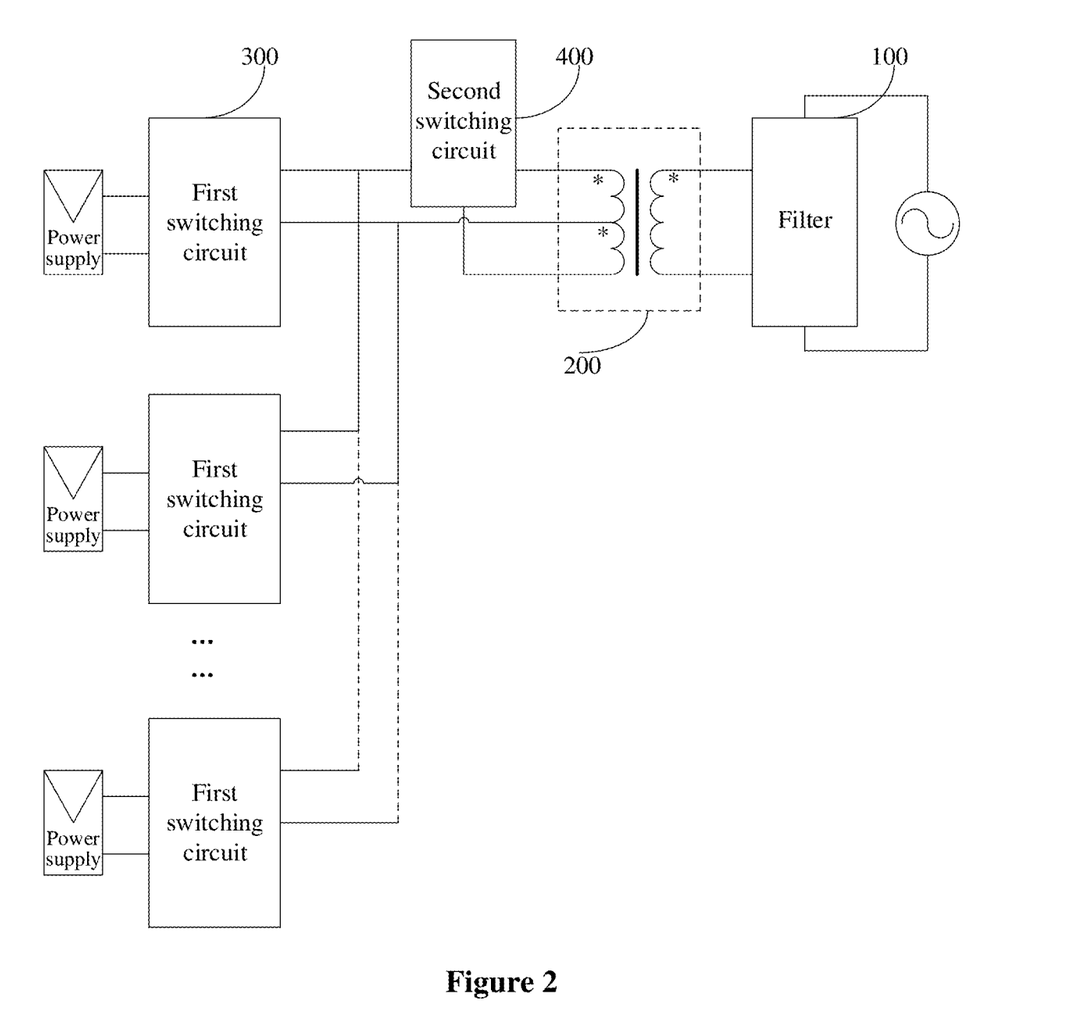
FIG. 2 is a structural diagram of a micro inverter according to an embodiment of the present disclosure.

A micro inverter is provided according to an embodiment of the present disclosure. A structural schematic diagram of such micro inverter is as shown in FIG. 2. The micro inverter includes a filter 100, a transformer 200, and a switching circuit.

The switching circuit includes one or more first switching circuits 300 and one second switching circuit 400. The first switching circuits 300 and the second switching circuit 400 each includes multiple switching devices.

Each of the first switching circuits 300 has an input terminal serving as an output terminal of a direct-current power supply, and the first switching circuit 300 is configured to convert a direct-current into an alternating current and output the alternating current to the second switching circuit 400. Each first switching circuit is connected to a corresponding power supply. The power supply may be a battery or a photovoltaic panel. The power supply converts solar energy into electrical energy and provides a direct current for the micro inverter. The first switching circuit 300 is configured to convert the direct current outputted from the power supply into an alternating current.

In a case that a quantity of the first switching circuits 300 is one, the output terminal of the first switching circuit may be directly connected to an input terminal of the second switching circuit. In a case that the quantity of the first switching circuits 300 is more than one, output terminals of the first switching circuits 300 may be connected in parallel with each other. An output terminal of the parallel-connected first switching circuits is connected to the input terminal of the second switching circuit 400. The output terminal of each first switching circuit 300 serves as an output of the alternating current. An alternating-current side of each of the first switching circuits 300 includes two terminals. One of the two terminals of one of the first switching circuit 300 is connected to one of the two terminals of another one of the first switching circuits 300. For example, the output terminal of each of the first switching circuits 300 includes terminal a and terminal b, the terminal a of one of the first switching circuits 300 is connected to the terminal a of another of the first switching circuits 300, and the terminal b of one of the first switching circuits 300 is connected to the terminal b of another one of the first switching circuits 300. The transformer 200 of the micro inverter may be an isolation transformer. A tap is disposed on a primary side of the transformer 200. The tap may be connected to one of the two terminals on the alternating-current side of each first switching circuit 300.

An output terminal of the second switching circuit 400 is connected to the primary side of the transformer 200. The second switching circuit 400 may be configured to regulate the alternating current outputted from the first switching circuit 300.

It should be noted that the second switching circuit may be a cycloconverter.

A secondary side of the transformer 200 is connected to an input terminal of the filter 100. The filter 100 is configured to filter the alternating current after transformation and output and integrate the filtered alternating current into a power grid.

Figure 3:
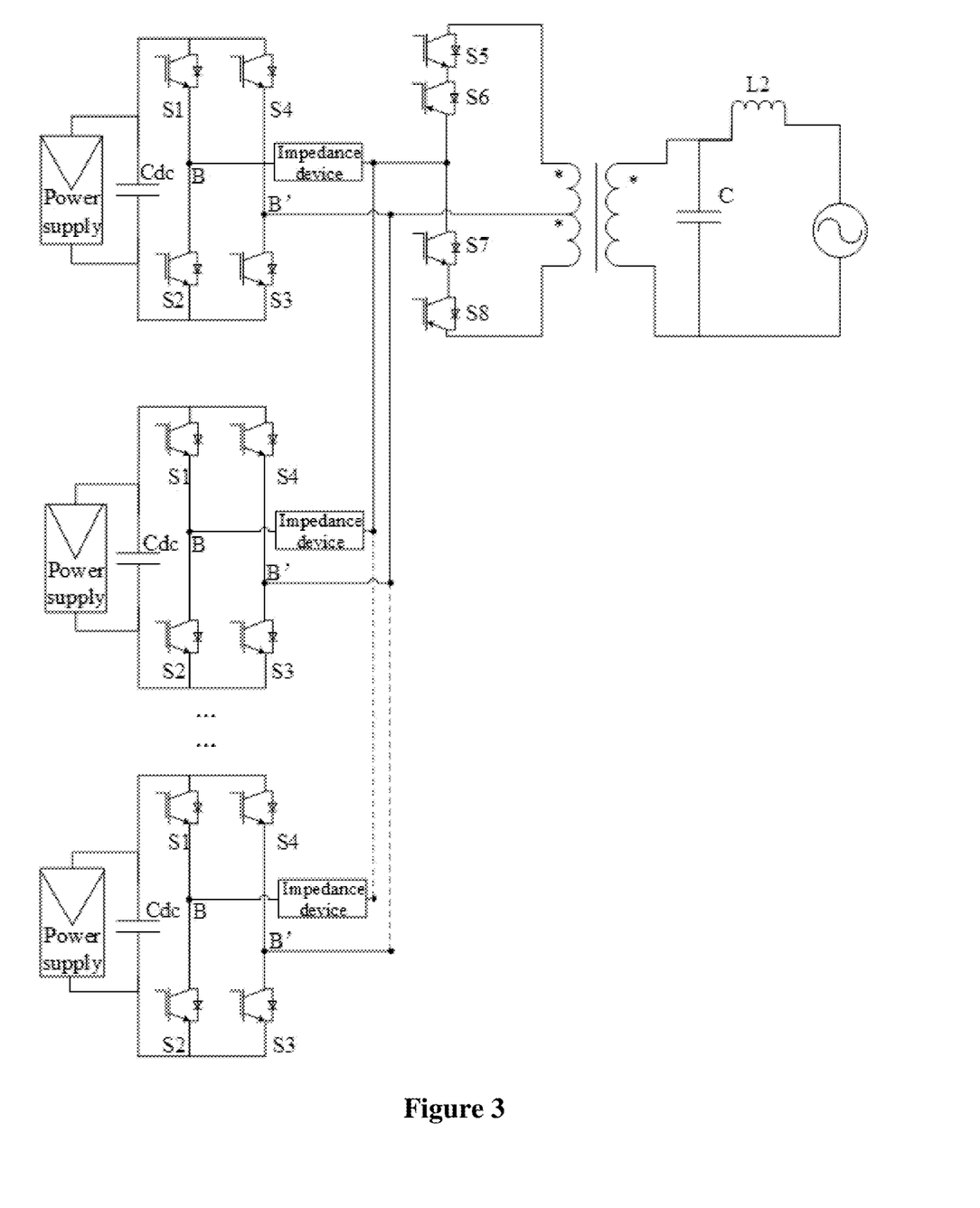
FIG. 3 illustrates details of a structural diagram of a micro inverter according to an embodiment of the present disclosure.

Reference is made to FIG. 3. The filter 100 of the micro inverter may be a single-stage LC filter (such as the filter including a capacitor C and an inductor L2, as shown in FIG. 3), a multi-stage LC filter, or an EMI filter. The filter 100 may be connected to a grid and serves as a grid-connected filter. The transformer 200 is configured to transform the alternating current outputted from the second switching circuit 400 and then input the transformed alternating current into the filter 100 for filtering.

In an embodiment of the present disclosure, each first switching circuit 300 is configured to receive a direct current from a corresponding power supply, convert the direct current into an alternating current, and output the alternating current to the second switching circuit 400. The second switching circuit 400 is configured to regulate the alternating current from the first switching circuit 300, and transform the regulated alternating current through the transformer 200. The alternating current after transformation is filtered through the filter 100 and then outputted.

In the micro inverter according to the embodiment of the present disclosure, the switching circuits are disposed on the primary side of the transformer. A direct current is converted through a corresponding one of the first switching circuits 300 into an alternating current, and is regulated through the second switching circuit 400. In such case, different regulated alternating currents are transformed through a same one transformer 200, and it is unnecessary to provide multiple transformers or an integrated transformer having multiple windings. In the micro inverter according to the embodiments of the present disclosure, a position of the transformer is adjusted compared to the conventional technology. Thereby, the number of transformers and the number of windings required in the circuit is reduced, a cost for the micro inverter is reduced, and a volume of the micro inverter is reduced.

In an embodiment of the present disclosure, the filter 100 of the micro inverter, as shown in FIG. 2, includes at least a common-mode capacitor.

Figure 4:
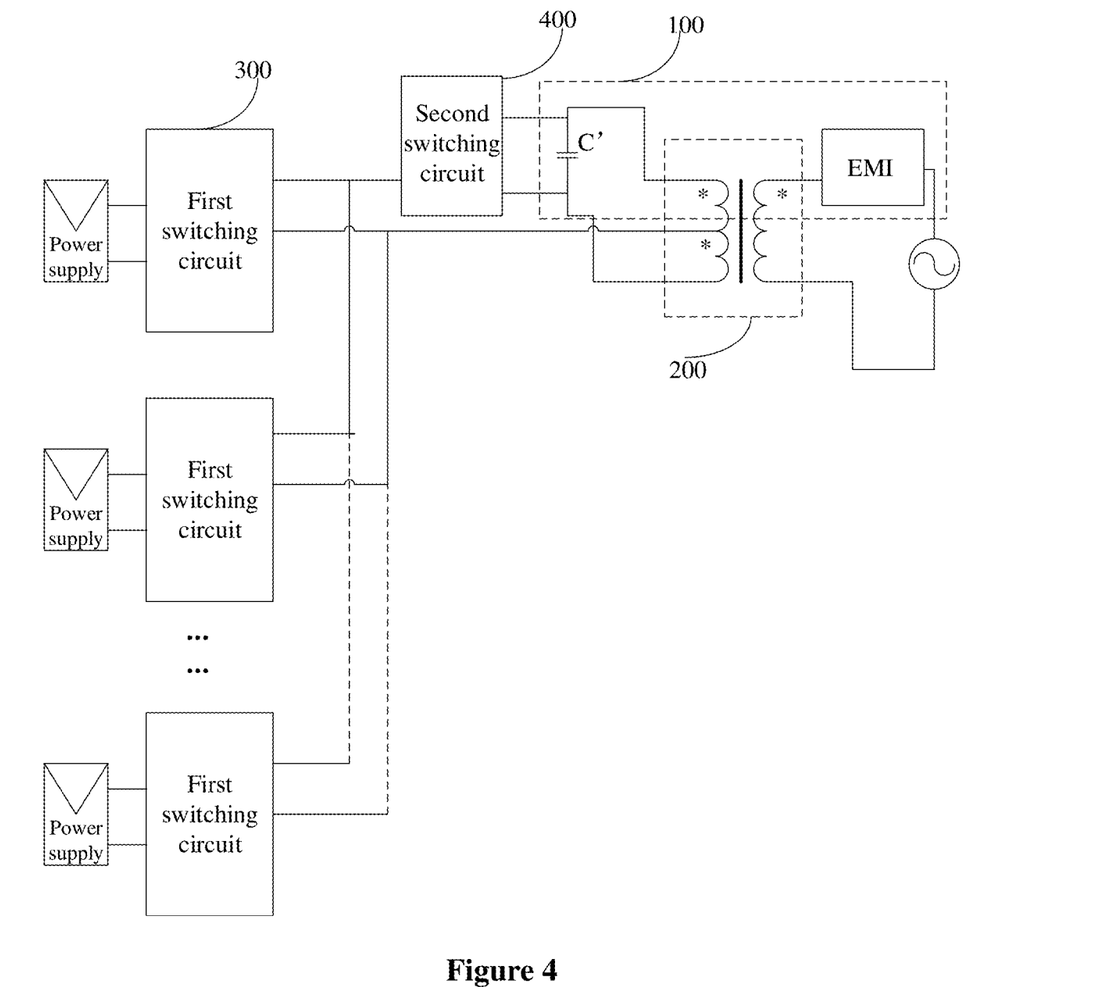
FIG. 4 is a structural diagram of a micro inverter according to another embodiment of the present disclosure.

The common-mode capacitor is connected to the secondary side of the transformer (as shown in FIG. 3, a capacitor C is connected to the secondary side of the transformer). Alternatively, the common-mode capacitor is connected to the primary side of the transformer (as shown in FIG. 4, a capacitor C' is connected to the primary side of the transformer). It should be noted that, in addition to the common-mode capacitor, the filter 100 further includes an inductor and other components, so as to serve as an LC filter or EMI filter. The EMI shown in FIG. 4 represents an EMI filter.

In the micro inverter, the second switching circuit 400 includes two switch groups.

Reference is made to FIG. 3. Each of the switch groups includes two switch transistors connected in reverse series (as shown in FIGS. 3, S6 and S7 represents two switch transistors from a same switch group, which are connected in reverse series; and S8 and S9 represents two switch transistors from a same switch group, which are connected in reverse series). A switch transistor includes one triode and one diode. A collector electrode of the triode is connected to a cathode of the diode, and an emitter electrode of the triode is connected to an anode of the diode.

Two switch groups are connected in series. A connection point of the two switch groups serves as the input terminal of the second switching circuit.

In a case that the common-mode capacitor is connected to the secondary side of the transformer, two terminals of the series-connected switch groups are connected to two terminals of the primary side of the transformer.

In an embodiment of the present disclosure, the first switching circuit 300 is an H-bridge. In FIG. 3, the H-bridge in each of the first switching circuits 300 includes switching devices S1, S2, S3, and S4. Each of the S1 to S4 includes one triode and one diode. For each of the S1 to S4, a collector electrode of the triode is connected to a cathode of the diode, and an emitter electrode of the triode is connected to an anode of the diode.

Further, the micro inverter may further include one or more input capacitors. As shown in FIG. 3, an input capacitor Cdc is connected in parallel with the first switching circuit 300. That is, the input capacitor is connected in parallel with a direct-current side of the H-bridge.

Two terminals of the direct-current side of the H-bridge serve as two electrodes of the input terminal of the first switching circuit. The two terminals of the direct-current side of the H-bridge are connected to the power supply. The input capacitor is connected with the H-bridge and the power supply module.

Further, the micro inverter may further include an impedance device. The impedance device is configured to perform power regulation on the alternating current outputted from each of the first switching circuits and output the regulated alternating current to the second switching circuit. As shown in FIG. 3, an input terminal of the impedance device is connected to one of the two terminals of the alternating-current side of the H-bridge, and an output terminal of the impedance device is connected to the input terminal of the second switching circuit 400.

In an example, the impedance device is a single inductor, or a resonant cavity including at least one inductor and a capacitor. In FIG. 3, the alternating-current side of the H-bridge has two terminals, i.e., B and B'. One of the terminals, terminal B, is connected to the impedance device, and the other of the terminals, terminal B', is connected to the tap of the primary side of the transformer 200. Wires from the two terminals of the alternating-current side of the H-bridge of each of the first switching circuits 300 are for connection. For example, in FIG. 3, a wire for connecting the impedance device and the terminal B of the alternating-current side of the H-bridge of a first one of the first switching circuits is connected to a wire for connecting the impedance device and the terminal B of the alternating-current side of the H-bridge of a second one of the first switching circuits. The terminal B' of the alternating-current side of the H-bridge of the first one of the first switching circuits is connected to the terminal B' of the alternating-current side of the H-bridge of the second one of the first switching circuits.

The other one of the two terminals of the alternating-current side of the H-bridge, which serves as an output terminal of the first switching circuit 300, is connected to the tap of the primary side of the transformer 200. In an example, for the two terminals of the alternating-current side of the H-bridge, the terminal connected to the impedance device is connected to the input terminal of the transformer 200, and the terminal not connected to the impedance device is connected to the tap of the primary side of the transformer 200.

In the present disclosure, the H-bridge includes a leading arm and a lagging arm.

There is a phase-shift angle between the leading arm and the lagging arm. The phase-shift angle between the leading arm and the lagging arm is referred to as an internal phase-shift angle. There is a phase-shift angle between the leading arm and the second switching circuit. The phase-shift angle between the leading arm and the second switching circuit referred to as an external phase-shift angle. In the H-bridge, S1 and S2 are leading arms, and S3 and S4 are lagging arms. The phase-shift angle between the leading arm and the lagging arm in each first switching circuit is represented as an internal phase-shift angle D1$i$, where i represents a serial number of the first switching circuit. The internal phase-shift angle of the leading arm of the H-bridge in the first one of the first switching circuits is represented as D11. The internal phase-shift angle of the leading arm of the H-bridge in the second one of the first switching circuits is represented as D12. The internal phase-shift angle of the leading arm of the H-bridge in the i-th one of the first switching circuits is represented as D1$i$.

The common-mode capacitor of the filter may be disposed on the primary side of the transformer. Based on the micro inverter shown in FIG. 2 above, the schematic structure of the micro inverter according to an embodiment of the present disclosure may be as shown in FIG. 4. The connection relationship between the first switching circuits 300 and the second switching circuit 400 in FIG. 4 is consistent with that in FIG. 2, and is not repeated here. In a case that the common-mode capacitor of the filter 100 is connected to the primary side of the transformer, the output terminal of the second switching circuit 400 is connected to the common-mode capacitor (C' as shown in FIG. 4) of the filter 100. The common-mode capacitor of the filter 100 is disposed on the primary side of transformer 200 and is connected in parallel with the second switching circuit 400. In the present disclosure, the micro inverter as shown in FIG. 4 performs a filtering process on the alternating current by using the common-mode capacitor to filter out a high-frequency current before transformation of the transformer 200.

The common-mode capacitor of the filter 100 is connected to the primary side of the transformer 200. A part other than the common-mode capacitor of the filter 100 is connected to the secondary side of the transformer 200 (such as the EMI as shown in FIG. 4). The filter 100 may be connected to a single inductor on the secondary side of the transformer 200. In a case that a single inductor is connected on the secondary side of the transformer 200, the inductor integrated on the secondary side of transformer 200 may serve as a secondary leakage inductor of the secondary winding of the transformer 200.

In an embodiment of the present disclosure, the first switching circuit 300 of each branch receives the direct current from the power supply module corresponding to the branch, converts the direct current into an alternating current, and outputs the alternating current to the second switching circuit 400. The alternating current is regulated by the second switching circuit 400, and then flows through the common-mode capacitor of the filter 100, and finally is transformed through the transformer 200 and outputted through the filter 100.

In the micro inverter according to the embodiment of the present disclosure, the first switching circuit and the second switching circuit are both disposed on the primary side of the transformer 200. In the micro inverter according to the embodiments of the present disclosure, a position of the transformer is adjusted compared to the conventional technology. Thereby, the number of transformers and the number of windings required in the circuit is reduced, a cost for the micro inverter is reduced, and a volume of the micro inverter is reduced. In addition, the common-mode capacitor is disposed on the primary side of the transformer, so that the high-frequency current can be filtered out from the alternating current through the common-mode capacitor. Thereby, the grid-connected filter can serve as the leakage inductor of the transformer, so that the filter is omitted and the cost is reduced.

Figure 5:
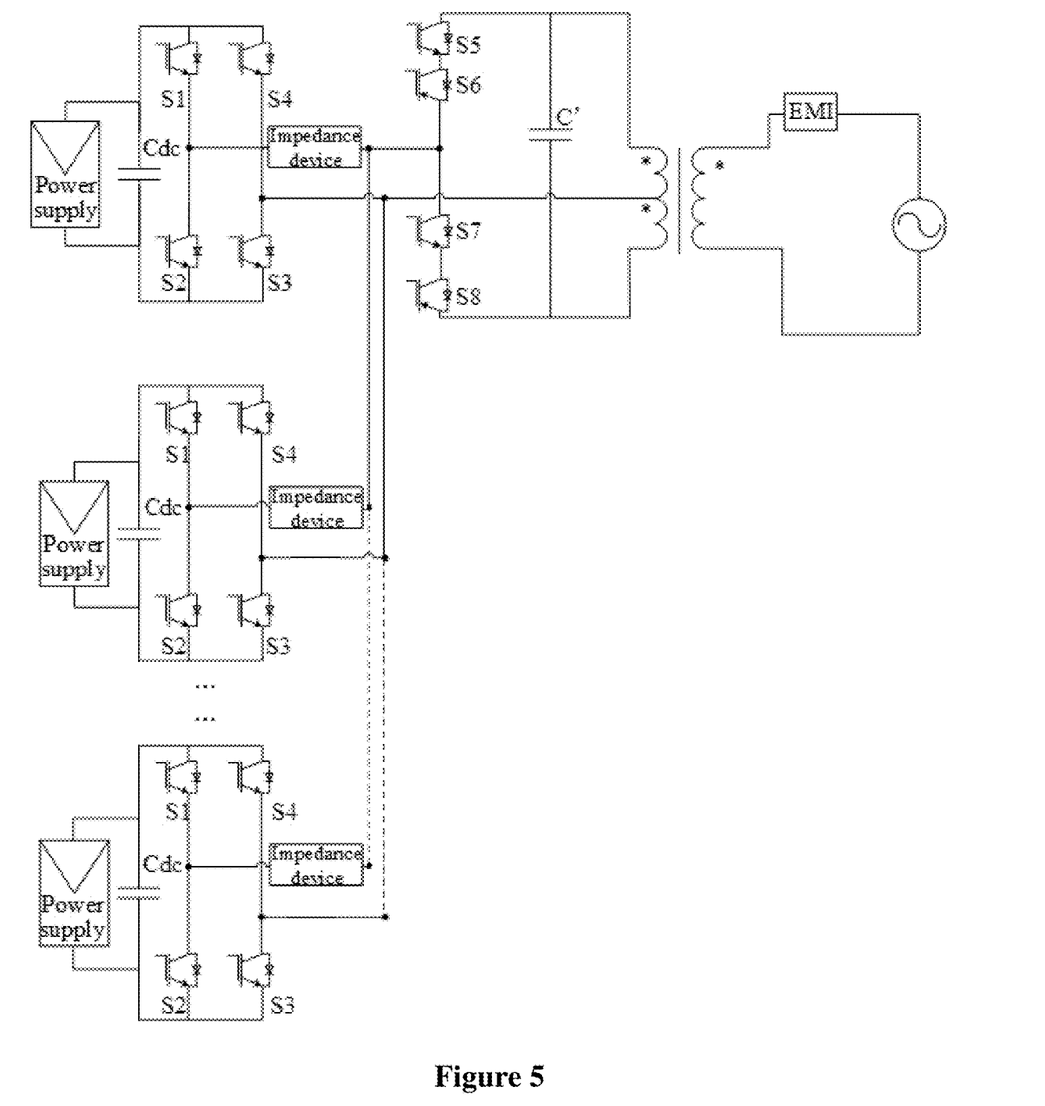
FIG. 5 illustrates details of a structural diagram of a micro inverter according to another embodiment of the present disclosure.

In an implementation, the common-mode capacitor of the filter is connected to the primary side of the transformer 200. In this case, connection between the common-mode capacitor and the second switching circuit on the primary side of the transformer may be as shown in FIG. 5. In FIG. 5, the second switching circuit 400 includes two switch groups. Each of the switch groups includes two switch transistors connected in reverse series. The two switch groups are connected in series. A connection point of the two switch groups serves as an input terminal of the second switching circuit. Two terminals of the series-connected two switch groups are connected in parallel with the common-mode capacitor of the filter 300. In a case that the first switching circuit 300 is an H-bridge, the micro inverter further includes an input capacitor and an impedance device. Two terminals of a direct-current side of the H-bridge are connected in parallel with the input capacitor and serve as two electrodes of the input terminal of the first switching circuit 300. An input terminal of the impedance device is connected to one of two terminals of an alternating-current side of the H-bridge. An output terminal of the impedance device serves as an output terminal of the first switching circuit 300 and is connected to the input terminal of the second switching circuit 400. The other one of the two terminals of the alternating-current side of the H-bridge serves as another output terminal of the first switching circuit 300 and is connected to a tap of the primary side of the transformer 200.

The impedance device is a single inductor or a resonant cavity including at least one inductor and a capacitor.

The structure and functions of the second switching circuit 400 and each first switching circuit 300 in FIG. 5 are consistent with the structure and functions of the second switching circuit 400 and the first switching circuits 300 shown in FIG. 3 of the above embodiment, and is not repeated here.

According to the embodiment of the present disclosure, in the micro inverter as shown in FIG. 5, the filtering capacitor C' functions on the primary side of the transformer 200 to filter out the high-frequency current. Compared to the LC filter in FIG. 3 in the above embodiment, the LC filter is omitted, so that the cost of the micro inverter is reduced.

Figure 6:
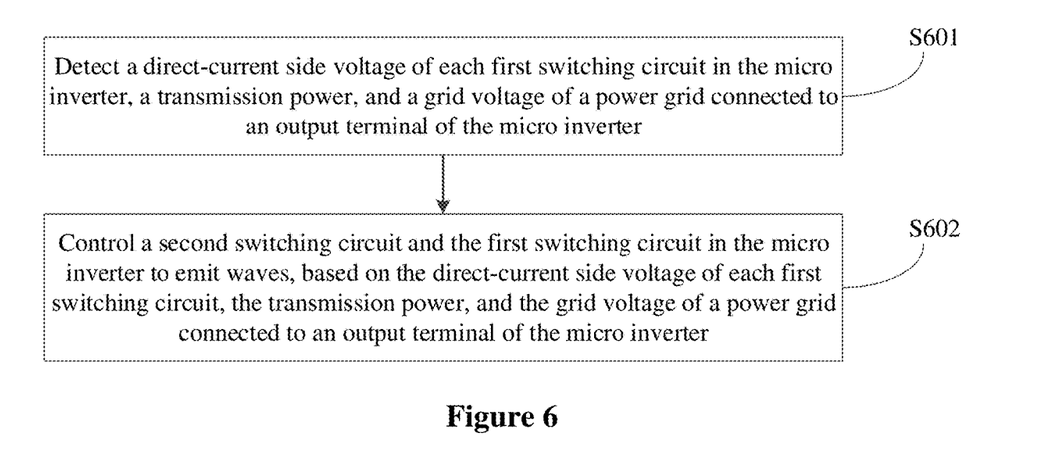
FIG. 6 is a flowchart of a method for modulating a micro inverter according to an embodiment of the present disclosure.

Corresponding to the micro inverter, a method for modulating a micro inverter is further provided according to an embodiment of the present disclosure, which achieves a specific application of the micro inverter. The method according to an embodiment of the present disclosure may be applied to the micro inverter. A flowchart of the method for modulating a micro inverter is as shown in FIG. 6. The method specifically includes S601 and S602.

In S601, a direct-current side voltage of each first switching circuit of the micro inverter, a transmission power, and a grid voltage of a power grid to which an output terminal of the micro inverter is connected are detected.

In the method according to an embodiment of the present disclosure, the micro inverter includes a filter, a second switching circuit, a transformer, and multiple first switching circuits. Each of the first switching circuits has an input terminal serving as an input terminal of the micro inverter and connected to a power supply module corresponding to the first switching circuit. Output terminals of the first switching circuits are sequentially connected in parallel to each other. A terminal of the parallel-connected output terminals of the first switching circuits is connected to an input terminal of the second switching circuit, and another terminal of the parallel-connected output terminals of the first switching circuits is connected to a tap of a primary side of the transformer. An output terminal of the second switching circuit is connected to the primary side of the transformer. A secondary side of the transformer is connected to an input terminal of the filter. An output terminal of the filter serves as an output terminal of the micro inverter.

In the method according to an embodiment of the present disclosure, the filter is a multi-stage LC filter or an EMI filter.

In the method according to an embodiment of the present disclosure, the transformer is an isolation transformer.

In the method according to an embodiment of the present disclosure, the second switching circuit includes two switch groups. Each of the switch groups includes two switch transistors connected in reverse series. The two switch groups are connected in series. A connection point of the two switch groups serves as the input terminal of the second switching circuit. In a case that the filter is on the secondary side of the transformer, the two terminals of the series-connected switch groups are connected to two terminals of the primary side of the transformer. In a case that the filter is on the primary side of the transformer, two terminals of the series-connected switch groups are connected in parallel with the filter.

It should be noted that the filter includes at least a common-mode capacitor. The common-mode capacitor may be connected to the secondary side of the transformer. Alternatively, the common-mode capacitor is connected to the primary side of the transformer.

In the method according to an embodiment of the present disclosure, the first switching circuit includes an H-bridge.

In the method according to an embodiment of the present disclosure, the micro inverter further includes an input capacitor and an impedance device.

Two terminals of a direct-current side of the H-bridge are connected in parallel with the input capacitor. The two terminals of the direct-current side of the H-bridge serve as two electrodes of the input terminal of the first switching circuit. An input terminal of the impedance device is connected to one of the two terminals of the alternating-current side of the H-bridge. An output terminal of the impedance device serves as an output terminal of the first switching circuit and is connected to the input terminal of the second switching circuit. The other one of the two terminals of the alternating-current side of the H-bridge serves as another output terminal of the first switching circuit and is connected to the tap of the primary side of the transformer. The impedance device is a single inductor or a resonant cavity including at least one inductor and a capacitor.

In the method according to an embodiment of the present disclosure, the filter is connected to the primary side of the transformer. In this case, the filter is a filtering capacitor and is connected in parallel with the second switching circuit.

In S602, the second switching circuit and each of the first switching circuits in the micro inverter are controlled to emit waves, based on the direction-current side voltage of each of the first switching circuits, the transmission power, and the grid voltage of the grid to which the output terminal of the micro inverter is connected.

In the method according to an embodiment of the present disclosure, an internal phase-shift angle between a leading arm and a lagging arm in the H-bridge of each of the first switching circuits and an external phase-shift angle between the leading arm and the second switching circuit of the micro inverter are calculated based on the direct-current side voltage of each of the first switching circuits, the transmission power, and the grid voltage.

A duty cycle of a signal pulse of the micro inverter is determined based on the internal phase-shift angle and the external phase-shift angle. A phase shifting or frequency conversion is performed based on the duty cycle. The second switching circuit and each of the first switching circuits in the micro inverter are controlled through the phase shifting or frequency conversion to emit waves.

In the method according to an embodiment of the present disclosure, the H-bridge includes a leading arm and a lagging arm. A phase-shift angle between the leading arm and the lagging arm is referred to as the internal phase-shift angle. A phase-shift angle between the leading arm and the second switching circuit is referred to as the external phase-shift angle.

In the method according to an embodiment of the present disclosure, the micro inverter according to the present disclosure requires only one transformer to achieve transmission of energy from the primary side of the transformer to the power grid on the secondary side. Therefore, in an application of the micro inverter according to the embodiment of the present disclosure, the micro inverter is different from the micro inverter according to the conventional technology in terms of the internal phase-shift angle and the external phase-shift angle.

With the method for modulating a micro inverter according to the embodiment of the present disclosure, the internal phase-shift angle and the external phase-shift angle are obtained. The internal phase-shift angle between the leading arm and the lagging arm and the external phase-shift angle between the leading arm and the second switching circuit are determined for the micro inverter. The second switching circuit and each of the first switching circuits in the micro inverter are controlled through the internal phase-shift angle and the external phase-shift angle to emit waves.

Implementations of each of the embodiments and derivatives thereof are all within the protection scope of the present disclosure.

The embodiments in this specification are described in a progressive manner, the same and similar parts between embodiments may be referred to each other, and each embodiment focuses on differences from other embodiments. In particular, description of the system or system embodiments is simplified, as they are similar to the method embodiments may be referred to relevant parts of the method embodiments. The above-described system and system embodiments are only schematic. A unit described as a separate component may or may not be physically separate. Components shown as units may or may not be physical units, that is, the components may be located in a same place or may be distributed on multiple network units. Some or all modules thereof may be selected based on an actual requirement to implement an objective of the solution in the embodiments. Those skilled in the art can understand and implement the embodiments without any creative effort.

Those skilled in the art may further understand that, units and algorithm steps described in conjunction with the embodiments disclosed herein may be realized by electronic hardware, computer software or a combination thereof.

In order to clearly describe interchangeability of the hardware and the software, the composition and steps of each embodiment are generally described above based on functions. Whether a function is to be implemented in a hardware form or a software form depends on a particular application of technical solutions and a design constraint. Those skilled in the art may implement the described functions through different methods for each specific application. Such implementation should not be considered going beyond the scope of the present disclosure.

The description of the embodiments herein enables those skilled in the art to implement or use the present disclosure. Various modifications to the embodiments are apparent for those skilled in the art. The general principles defined herein may be applied to other embodiments without departing from the spirit or scope of the present application. Therefore, the present application should not be limited to the embodiments disclosed herein, but has the widest scope conform to the principle and the novel features disclosed in the present disclosure.

The invention claimed is:

1. A micro inverter, applied to a photovoltaic system, wherein the micro inverter comprises a filter, a transformer, and a switching circuit, and wherein:
the switching circuit comprises one or more first switching circuits and one second switching circuit;
each of the first switching circuits has an input terminal serving as an output terminal of a direct-current power supply, and is configured to convert a direct current into an alternating current and output the alternating current to the second switching circuit;
an output terminal of the second switching circuit is connected to a primary side of the transformer;
a secondary side of the transformer is connected to an input terminal of the filter,
an output terminal of the filter serves as an output terminal of the photovoltaic system; and
each of the first switching circuits is an H-bridge, the H-bridge comprises a leading arm and a lagging arm, a phase-shift angle between the leading arm and the lagging arm is an internal phase-shift angle, and a phase-shift angle between the leading arm and the second switching circuit is an external phase-shift angle.

2. The micro inverter according to claim 1, wherein the filter is a single-stage filter, a multi-stage LC filter, or an EMI filter.

3. The micro inverter according to claim 1, wherein
the filter comprises at least a common-mode capacitor; and
the common-mode capacitor is connected to the secondary side of the transformer, or the common-mode capacitor is connected to the primary side of the transformer.

4. The micro inverter according to claim 1, wherein the transformer is an isolation transformer.

5. The micro inverter according to claim 1, wherein
the second switching circuit comprises two switch groups;
each of the switch groups comprises two switch transistors connected in reverse series; and
the two switch groups are connected in series, and a connection point of the two switch groups serves as an input terminal of the second switching circuit.

6. The micro inverter according to claim 5, wherein
two terminals of the series-connected switch groups are connected to two terminals of the primary side of the transformer, in a case that the common-mode capacitor is connected to the secondary side of the transformer; and
two terminals of the series-connected switch groups are connected to the common-mode capacitor, in a case that the common-mode capacitor is connected to the primary side of the transformer.

7. The micro inverter according to claim 1, wherein
a quantity of the first switching circuits is more than one,
output terminals of the first switching circuits are connected in parallel with each other, and
the parallel-connected first switching circuits are connected to the second switching circuit.

8. The micro inverter according to claim 1, further comprising one or more input capacitors, wherein
each of the input capacitors is connected in parallel with an input terminal of a corresponding one of the first switching circuits.

9. The micro inverter according to claim 8, further comprising an impedance device, wherein
the impedance device is configured to perform power regulation on the alternating current outputted from each of the first switching circuits and output a regulated alternating current to the second switching circuit.

10. The micro inverter according to claim 9, wherein the impedance device is a single inductor, or a resonant cavity comprising at least one inductor and at least one capacitor.

11. The micro inverter according to claim 1, wherein the alternating current is a high-frequency alternating current.

12. A method for modulating a micro inverter, wherein the method is applied to the micro inverter and the method comprises:
detecting a direct-current side voltage of each first switching circuit of the micro inverter, a transmission power, and a grid voltage of a power grid connected to an output terminal of the micro inverter; and
controlling a second switching circuit and the first switching circuit of the micro inverter to emit waves, based on the direct-current side voltage of each first switching circuit of the micro inverter, the transmission power, and the grid voltage of a power grid connected to an output terminal of the micro inverter;
wherein the controlling a second switching circuit and the first switching circuit of the micro inverter to emit waves, based on the direct-current side voltage of each first switching circuit of the micro inverter, the transmission power, and the grid voltage of a power grid connected to an output terminal of the micro inverter comprises:
calculating, based on the direct-current side voltage of each first switching circuit, the transmission power and the grid voltage, an internal phase-shift angle between a leading arm and a lagging arm in an H-bridge of each first switching circuit and an external phase-shift angle between the leading arm and the second switching circuit of the micro inverter;
determining a duty cycle of a signal pulse of the micro inverter based on the internal phase-shift angle and the external phase-shift angle; and
performing, based on the duty cycle, phase shifting or frequency conversion to control the second switching circuit and the first switching circuits of the micro inverter to emit waves.

\* \* \* \* \*